(12) United States Patent
Wang et al.

(10) Patent No.: US 6,591,030 B2
(45) Date of Patent: Jul. 8, 2003

(54) METHOD OF MIRROR LAYOUT OF MULTI-LEVEL OPTICAL SWITCH

(75) Inventors: Ja-Nan Wang, Taipei Hsien (TW); Shih-Chiang Lin, Kaohsiung (TW); Jiun-Shyong Wu, Taoyuan Hsien (TW)

(73) Assignee: Industrial Technology Research Institute, Hsinchu (TW)

( * ) Notice: Subject to any disclaimer, the term of this patent is extended or adjusted under 35 U.S.C. 154(b) by 134 days.

(21) Appl. No.: 09/802,462

(22) Filed: Mar. 9, 2001

(65) Prior Publication Data

US 2001/0043770 A1 Nov. 22, 2001

(30) Foreign Application Priority Data

Apr. 24, 2000  (TW) ........................................ 89107668 A

(51) Int. Cl.[7] ............................................ G02B 206/26
(52) U.S. Cl. ........................................... 385/18; 385/17
(58) Field of Search ........................ 385/16–18, 19–24, 385/31, 41, 42

(56) References Cited

U.S. PATENT DOCUMENTS 4,815,827 A    3/1989  Lane
5,018,129 A  *  5/1991  Netravali et al. ............ 359/109
6,091,723 A  *  7/2000  Even .......................... 340/2.21
6,317,530 B1 * 11/2001  Ford .......................... 359/212

* cited by examiner

Primary Examiner—Robert H. Kim
Assistant Examiner—Michael H Caley
(74) Attorney, Agent, or Firm—J.C. Patents

(57) ABSTRACT

A method of positioning reflecting mirrors inside a multi-level optical switch. The multi-level optical switch has a plurality of input terminals and a plurality of output terminals. A first fixed single-sided reflecting mirror and a second fixed single-sided reflecting mirror are installed such that the reflecting surfaces of the first and the second fixed single-sided reflecting mirrors face each other and are parallel to each other. The input terminals are divided into an odd group and an even group. Cross-points of optical paths are computed by feeding the input light paths from the odd group and the even group using a network exchange algorithm. Double-sided reflecting mirrors are positioned at the corresponding optical path cross-points in the double-sided reflecting mirror layout region of the multi-level optical switch.

4 Claims, 6 Drawing Sheets

METHOD OF MIRROR LAYOUT OF MULTI-LEVEL OPTICAL SWITCH

CROSS-REFERENCE TO RELATED APPLICATION

This application claims the priority benefit of Taiwan application serial no. 89107668, filed Apr. 24, 2000.

BACKGROUND OF THE INVENTION

1. Field of Invention

The present invention relates to a switch. More particularly, the present invention relates to a mirror layout of an optical switch.

2. Description of Related Art

In optical fiber communication, an optical switch that employs a micro-electromechanical system (MEMS) has become an important component for relaying optical signals. A conventional optical switch has a one-to-one crossbar configuration. FIG. 1 is a schematic layout of the mirrors inside a conventional one-to-one crossbar optical switch.

As shown in FIG. 1, the optical switch 10, such as 4-by-4 optical switch, consists of a set of 16 reflecting mirrors $S_{ij}$ arranged into a 4-by-4 matrix configuration where i and j are integers that range from 1 to 4 respectively. An incident beam enters the optical switch from the left in one of the four input optical paths $I_1, I_2, I_3$ and $I_4$. After an internal reflection takes place somewhere inside the optical switch, the incident beam leaves the optical switch 10 from the bottom out of one of the four output optical paths $O_1, O_2, O_3$ and $O_4$. All the reflecting mirrors $S_{ij}$ can be individually raised or lowered. If the reflecting mirror $S_{11}$ is raised while all the other mirrors are lowered, the incident beam that enters the optical switch 10 through input optical path $I_1$ will leave via output optical path $O_1$. Similarly, the incident light beam from the optical path $I_1$ can be redirected to output optical paths $O_2$, $O_3$ and $O_4$ by raising the mirrors $m_{12}, m_{13}$ and $m_{14}$ while lowering the other mirrors, respectively. To carry out optical switching, such as redirecting the incident beam from input optical path $I_3$ to output optical path $O_4$, the reflecting mirror $m_{34}$ can be raised while all the other mirrors, including $S_{31}$, $S_{32}, S_{33}$ and $S_{44}$, are all lowered.

The raising and lowering of reflecting mirrors $S_{ij}$ is normally triggered by a control logic circuit (not shown in FIG. 1). By raising and lowering the reflecting mirrors in various combinations, the incident beam can be reflected by an internal mirror to any desired output optical path of the optical switch. Hence, switching multiple light sources to multiple destinations is available. Each row and each column must have one reflecting mirror raised depending upon the incoming-to-outgoing light path. The raising and lowering of the reflecting mirrors within the optical switch is normally controlled by logical circuits. In general, the reflecting mirrors are moved and controlled by a micro-electromechanical technology, existing in exsitent patents or papers.

The aforementioned crossbar arrangement of reflecting mirrors has one major drawback. As the switching optical paths increase, the number of reflecting mirrors inside the optical switch increases as the square of the number of input or output paths. However, putting too many reflecting mirrors inside an optical switch may lower production yield and reliability.

Aside from the one-to-one crossbar configuration, an optical switch that uses double-sided reflecting mirrors 24, 32, 34, 36 and 38 and fixed mirrors 22a, 22b is proposed in U.S. Pat. No. 4,815,827, which is shown in FIG. 2. Although multiple reflections are used to carry out the optical switching, the prior art structure still has to use many reflecting mirrors.

FIG. 2 is a schematic diagram showing an optical switch that utilizes multiple reflections. As shown in FIG. 2, the optical switch 20 includes two single-sided reflecting mirrors 22a and 22b. The reflecting mirrors 22a and 22b are parallel to each other with their reflecting surfaces facing each other. Symmetrically positioned between the two reflecting mirrors 22a and 22b is an axis Y. Along the axis Y are twelve double-sided equidistantly spaced reflecting mirrors 24. In addition, double-sided reflecting mirrors 32, 34, 36 and 38 are positioned between the reflecting mirrors 22a and 22b according to desired light-reflecting and switching conditions. With this structure, a 4-by-4 configuration switching can be achieved between input optical paths $I_1, I_2, I_3$ and $I_4$ and output optical paths $O_1, O_2, O_3$ and $O_4$. However, the structure requires 16 double-sided mirrors altogether in addition to the two fixed mirrors 22a and 22b. Hence, other than equalizing the propagation distance in each of the optical routes, the number of reflecting mirrors is the same as the crossbar structure shown in FIG. 1, not reducing the number of the doubled-side reflecting mirrors.

In short, the one-by-one crossbar configuration inside the optical switch in FIG. 1 uses the largest number of reflecting mirrors. When a micro-electromechanical system is incorporated into the optical switch, the area needed to form the optical switch is proportional to the number of reflecting mirrors. In other words, the area required to form the optical switch is large when the one-by-one crossbar configuration is used. Hence, system production yield, system reliability and production cost all will be affected.

If there exists a systematic method for the mirror layout of the multi-level optical switch, the manufacturing area can be reduced considerably. In addition, when the number of reflecting mirrors is reduced, circuits for driving the reflecting mirror are correspondingly reduced, and possible errors, chance of failures and power consumption of the optical switch are all lowered.

SUMMARY OF THE INVENTION

Accordingly, one object of the present invention is to provide a method for laying out the reflecting mirrors of a multi-level optical switch so that the switch uses a less number of reflecting mirrors and occupies less area.

A second object of the invention is to provide a method that utilizes Batcher's odd-even merging network theory to arrange the reflecting mirrors inside a multi-level optical switch.

A third object of the invention is to provide a method that utilizes Batcher's odd-even merging network theory to arrange the reflecting mirrors inside a optical switch with power of 2 input/output optical paths.

To achieve these and other advantages and in accordance with the purpose of the invention, as embodied and broadly described herein, the invention provides a method for laying out the reflecting mirrors of a multi-level optical switch. The multi-level optical switch includes a plurality of input terminals and a plurality of output terminals. A first fixed single-sided reflecting mirror and a second fixed single-sided reflecting mirror are installed inside the multi-level optical switch. The reflecting surfaces of the first and the second fixed single-sided reflecting mirrors face each other and are parallel to each other. The area between the first and the second fixed reflecting mirrors form the layout region for the double-sided reflecting mirrors. The layout region has a plurality of optical path cross-points capable of separating the incoming light rays into either an odd optical group or an even optical group. Various incoming light paths of the odd optical group are assimilated using a network-switching algorithm to compute a plurality of optical path cross-points. Similarly, various incoming light paths of the even optical group are assimilated using a network-switching algorithm to compute a plurality of optical path cross-points. A double-reflecting mirror is positioned at the optical cross-point on the rectangular matrix inside the multi-level optical switch. The location for the double-reflecting mirror is found by the network-switching algorithm. The double-reflecting mirror can reflect light or let the light pass therethrough.

The network-switching algorithm includes a Batcher's odd-even merging network that uses a 2-by-2 comparator as the basic unit. Hence, the layout of any N (positive and with power of two) level optical switch can be computed using the Batcher's odd-even merging network method.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
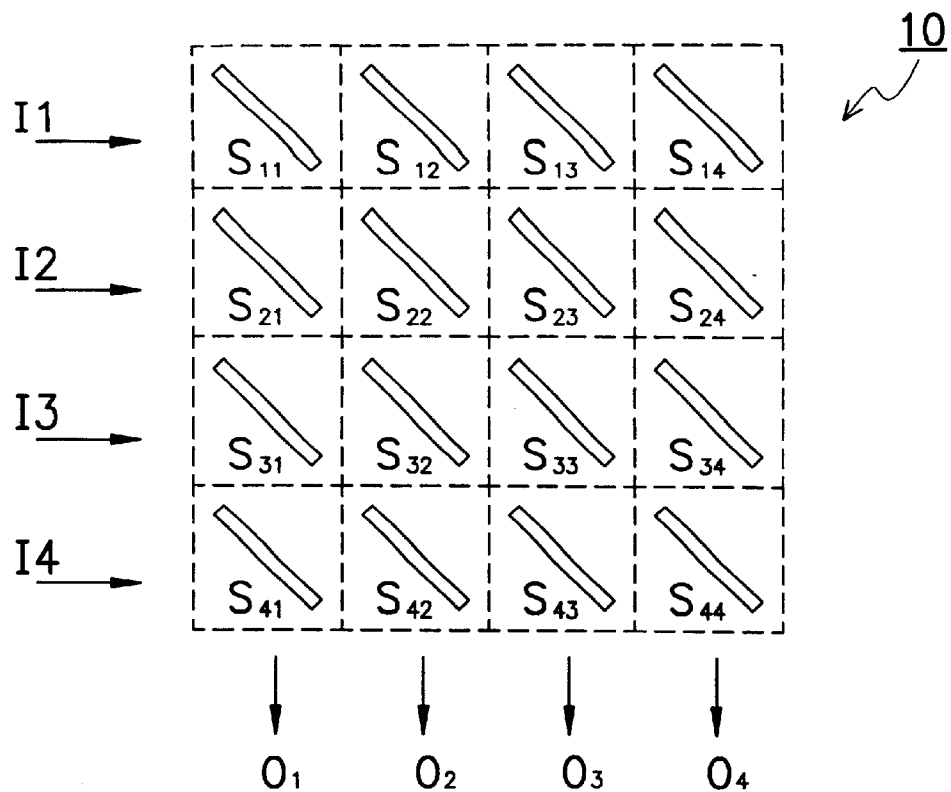
FIG. 1 is a schematic diagram of the crossbar mirrors inside a conventional 4-by-4 optical switch.
Figure 2:
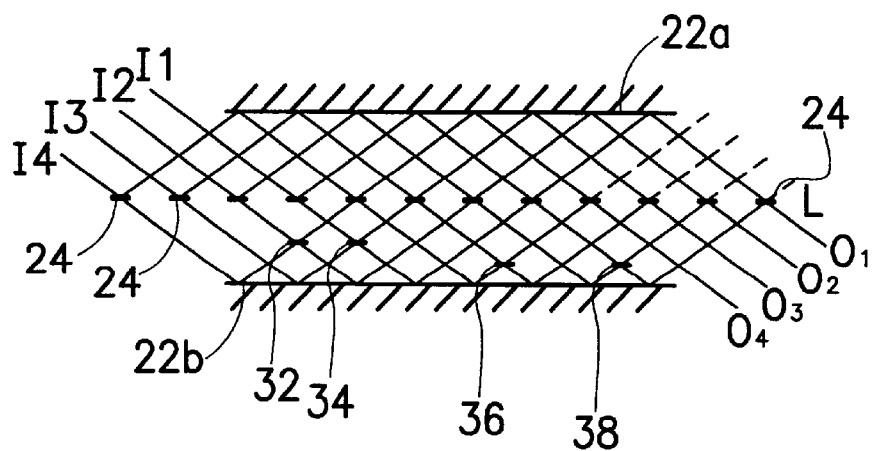
FIG. 2 is a schematic diagram showing another conventional 4-by-4 optical switch that utilizes multiple reflections.

Reference will now be made in detail to the present preferred embodiments of the invention, examples of which are illustrated in the accompanying drawings. Wherever possible, the same reference numbers are used in the drawings and the description to refer to the same or like parts.

Figure 3:
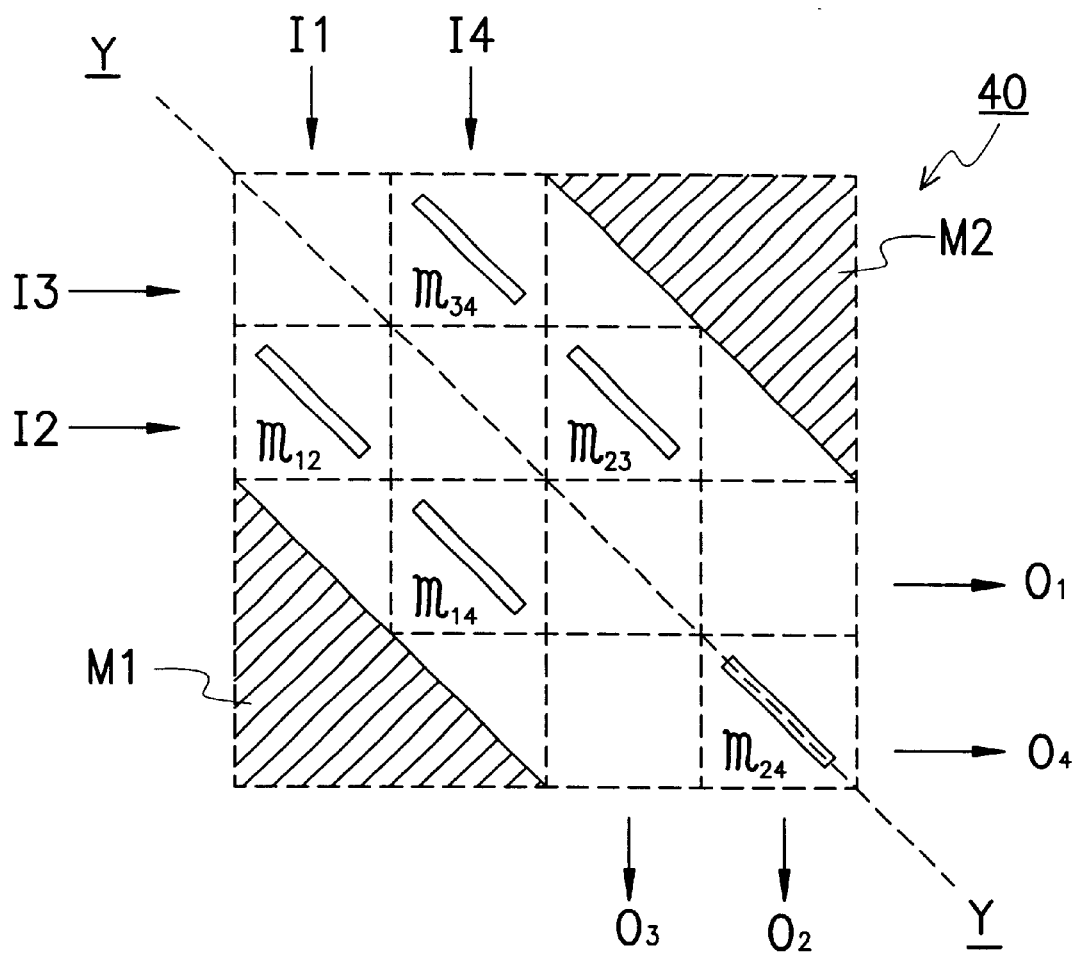
FIG. 3 is a schematic diagram of the mirror arrangement inside a 4-by-4 multi-mirror reflection optical switch according to one preferred embodiment of this invention.

FIG. 3 is a schematic diagram of a 4-by-4 multi-mirror reflection optical switch 40 according to one preferred embodiment of this invention. The optical switch 40 includes a first fixed single-sided reflecting mirror M1 and a second fixed single-sided reflecting mirror M2. The reflecting surfaces of the first and the second reflecting mirrors M1 and M2 face each other and are parallel to each other. The area between the two single-sided reflecting mirrors M1 and M2 is a region for installing double-sided reflecting mirrors $m_{ij}$ (i, j=1~4). In this example, the double-sided reflecting mirrors are $m_{12}$, $m_{34}$, $m_{14}$, $m_{23}$, and $m_{24}$. These double-sided reflecting mirrors $m_{12}$, $m_{34}$, $m_{14}$, $m_{23}$, and $m_{24}$ are oriented in a direction parallel to the reflecting surfaces of both the first and the second fixed reflecting mirrors M1 and M2. Different from the single-sided reflecting mirrors M1 and M2, the double-sided reflecting mirrors $m_{12}$, $m_{34}$, $m_{14}$, $m_{23}$, and $m_{24}$ can be raised or lowered by control logic units. Through the fixed reflecting mirrors M1 and M2 and various configurations of the double-sided reflecting mirrors $m_{12}$, $m_{34}$, $m_{14}$, $m_{23}$ and $m_{24}$, optical paths are switched.

When all the double-sided reflecting mirrors $m_{12}$, $m_{34}$, $m_{14}$, $m_{23}$, and $m_{24}$ are lowered, incoming light beam through input terminals $I_1$~$I_4$ will be reflected only by the fixed reflecting mirrors M1 and M2. Hence, the light beam will be re-routed to output terminals $O_1$~$O_4$, respectively. Optical path 1 is defined as the route of a light beam that enters the input terminal $I_1$, reflects off the second fixed reflecting mirror M1 and finally emerges out of the output terminal $O_1$. Optical paths 2~4 are similarly defined.

For example, when a light beam entering from the first input terminal $I_1$ to the second output terminal $O_2$ requires to raise the double-sided mirror $m_{12}$ while lower the other double-sided mirrors. Hence, incoming light beam entering from the input terminal $I_1$ of the optical switch 40 is reflected by the double-sided mirror $m_{12}$ to the fixed reflecting mirror M2, which in turn is reflected to output terminal $O_2$. To re-direct incoming light beam from the input terminal $I_1$ to the output terminal $O_3$, both double-sided reflecting mirrors $m_{12}$ and $m_{23}$ must be raised while the other mirrors are lowered. The incoming light beam entering from the input terminal $I_1$ encounters the first double-sided reflecting mirror $m_{12}$ and then reflects to the mirror $m_{23}$. The reflected light beam from the mirror $m_{23}$ then emerges from the output terminal $O_3$. Light beam entering from the other input terminals $I_1$, $I_2$, $I_3$ and $I_4$ can also be re-routed to various output terminals $O_1$, $O_2$, $O_3$ and $O_4$ by raising and lowering the double-sided reflecting mirrors $m_{12}$, $m_{34}$, $m_{14}$, $m_{23}$, and $m_{24}$. Hence, the functions of a 4-by-4 optical switch are implemented.

The raising and lowering of the double-sided reflecting mirrors $m_{12}$, $m_{34}$, $m_{14}$, $m_{23}$, and $m_{24}$ inside the optical switch is determined by comparing two predetermined ouput terminals. Using the double-sided reflecting mirror $m_{12}$ as an example, when the destination output terminal of the input terminal $I_1$ is greater in value than the destination output terminal of $I_2$, the optical paths are exchanged. In other words, the optical path is switched while the double-sided reflecting mirror $m_{12}$ is raised.

Due to the optical switching characteristics of a 4-by-4 optical switch, a binary sorting-merging network can be used to calculate the layout of the double-sided reflecting mirror of a higher level optical switch. The method involves finding all the cross-points of all the optical paths through a sorting network and then placing the mirrors according to causality of position relation. Hence, as long as the size of the optical switch is power of two (such as 4-by-4, 8-by-8, 16-by-16, 32-by-32 and so on), Batcher's odd-even merging network can be used to find the cross-points of a particular optical switch.

The following is a brief description of the theory behind the operation of Batcher's odd-even merging network. A size 2 Batcher's merging network is basically a 2-by-2 comparator. The comparator compares two inputs and outputs a sorted result. In a larger merging network, several comparators are used repetitively to obtain sorted output.

Consider two sorting sequences X and Y, where $X=x_0\ x_1\ x_2\ x_3, \ldots, x_{M-1}$ and $Y=y_0\ y_i\ y_2\ y_3, \ldots, y_{M-1}$. Hence, the X and the Y sequences each have M elements. If $Z=z_0\ z_1\ z_2\ z_3, \ldots, z_{M-1}$ is the final sorting result, the resulting sequence is formed by switching and merging the elements in the X and the Y sequences. Assume that $Z=z_0\ z_1\ z_2\ z_3, \ldots, z_{M-1}=a_0\ a_1\ a_2\ a_3, \ldots, a_{M-1}$ and $Z_0=b_0\ b_1\ b_2\ b_3, \ldots, b_{M-1}$ are the results of selecting all the even elements $x_0, x_2, \ldots, x_{M-2}$ and $y_0, y_2, y_{M-2}$ in the X and Y sequences and the results of selecting all the odd elements $x_1, x_3, \ldots, x_{M-1}$ and $y_1, y_3, \ldots, y_{M-1}$ in the X and Y sequences, respectively. The sequence Z can be obtained by comparing elements $(a_i, b_{i-1})$ (where $1 \leq i \leq M$). In addition, in the merged sequence, $a_0$ is the smallest element and $b_{M-1}$ is the largest element. The sorting scheme is as follows:

$$z_0 = a_0 b_0 b_1 b_2 b_3 b_4, \ldots b_{2M-1}$$

$$z_{2m-1} = \min(a_m, b_{m-1}), 1 \leq i \leq M$$

$$z_{2m-1} = \min(a_m, b_{m-1}), 1 \leq i \leq M$$

$$z_{2M-1} = b_{M-1}$$

In general, $O_L^*$ is used to represent the merging of two sorting sequences, each having a spatial odd-even network size of L/2.

Figure 4A:
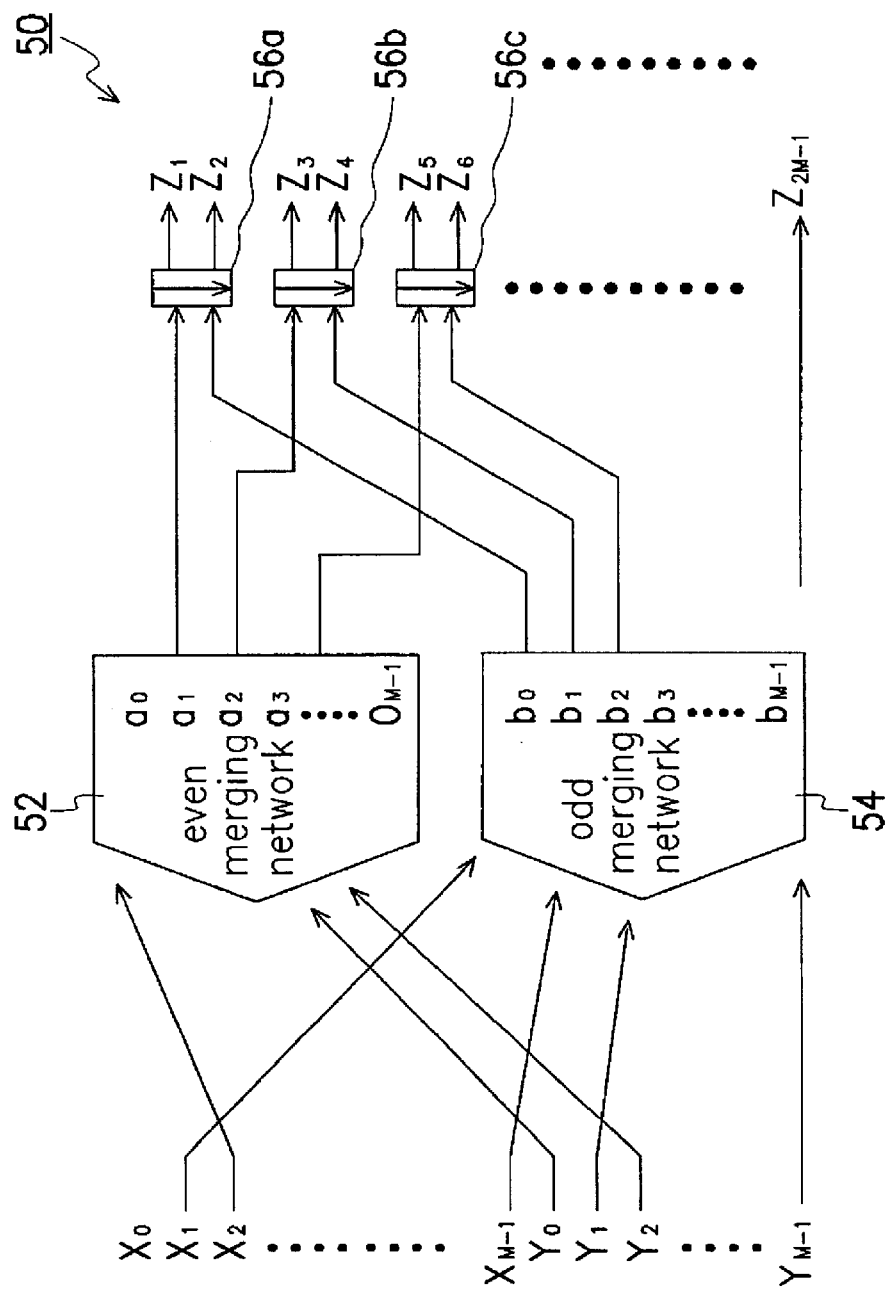
FIG. 4A is a schematic diagram showing the architecture of a Batcher's odd-even merging network.

FIG. 4A is a schematic diagram showing the architecture of a Batcher's odd-even merging network. As shown in FIG. 4A, even terms $x_0, x_2, \ldots, x_{M-2}$ of the sorted sequence X and even terms $y_0, y_2, \ldots, y_{M-2}$ of the sorted sequence Y are input into an even merging network 52 so that a merged and sorted sequence $a_0 a_1 a_2 a_3, \ldots, a_{M-1}$ is output. Similarly, odd terms $x_1, x_3, \ldots, x_{M-1}$ of the sorted sequence X and even terms $y_1, y_3, \ldots, y_{M-1}$ of the sorted sequence Y are input into an odd merging network 54 so that a merged and sorted sequence $b_0 b_1 b_2 b_3, \ldots, b_{M-1}$ is output. The output $a_0$ is the smallest value in the sorted sequence while the output $b_{M-1}$ is the largest value in the sorted sequence. A plurality of 2-by-2 comparators 56a, 56b, 56c, ... is used for sorting a pair of inputs. One input comes from the even merging network 52, while the other input comes from the odd merging network 54. For example, the 2-by-2 comparator 56a receives the output $a_1$ from the even merging network 52 and the output $b_0$ from the odd merging network 54 and then compares their sequence to produce outputs $z_1$ and $z_2$. Similarly, the other 2-by-2 comparators 56b, 56c, 56d, ... operates on $a_2, a_3, a_4, \ldots$ and $b_1, b_2, b_3, \ldots$ alternately to produce $z_3/z_4, z_5/z_6, z_7/z_8, \ldots$, respectively.

Figure 4B:
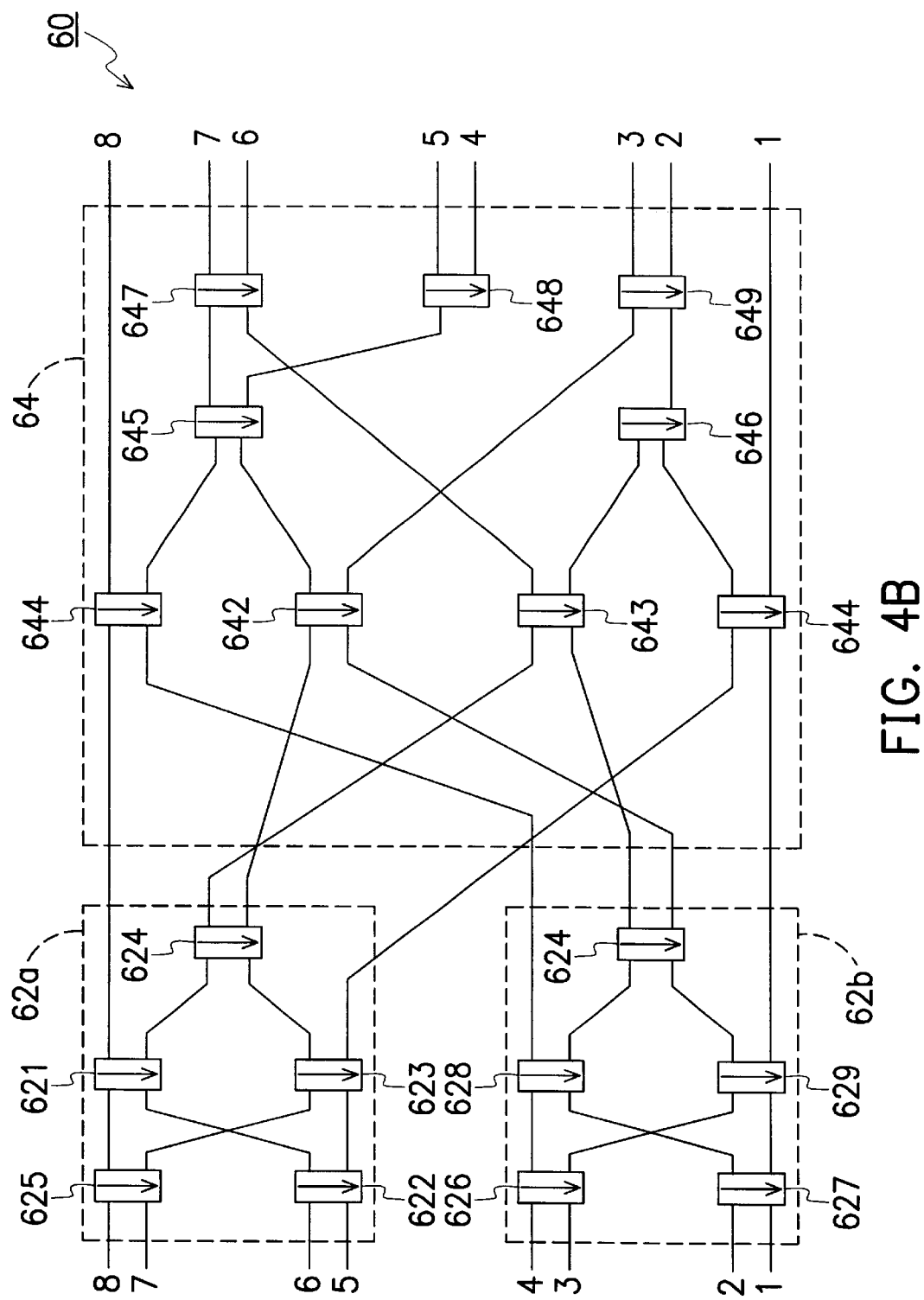
FIG. 4B is a schematic diagram showing the architecture of an eight-level Batcher's odd-even merging network.

FIG. 4B is a schematic diagram showing the architecture of an eight-level Batcher's odd-even merging network. As shown in FIG. 4B, the $O_8$ merging network 60 is composed of two $O_4$ merging networks 62a and 62b and an $O_8^*$ spatial odd-even network 64. Inside the $O_4$ merging network 62a are 2-by-2 comparators 621~625 whose structural arrangement has been described before. Similarly, inside the $O_4$ merging network 62b are 2-by-2 comparators 626~630. The $O_8^*$ spatial odd-even network 64 includes 2-by-2 comparators 641~649. Using the $O_8$ merging network 60, eight inputs 1~8 can be compared and sorted to produce a resulting output sequence.

In FIG. 4B, each 2-by-2 comparator 621~630 and 641~649 may represent a double-sided reflecting mirror capable of switching between two optical paths in this invention.

The aforementioned Batcher's odd-even merging network can be used for finding the correct locations of reflecting mirrors inside a multi-level optical switch having a plurality of input terminals and output terminals.

Figure 5:
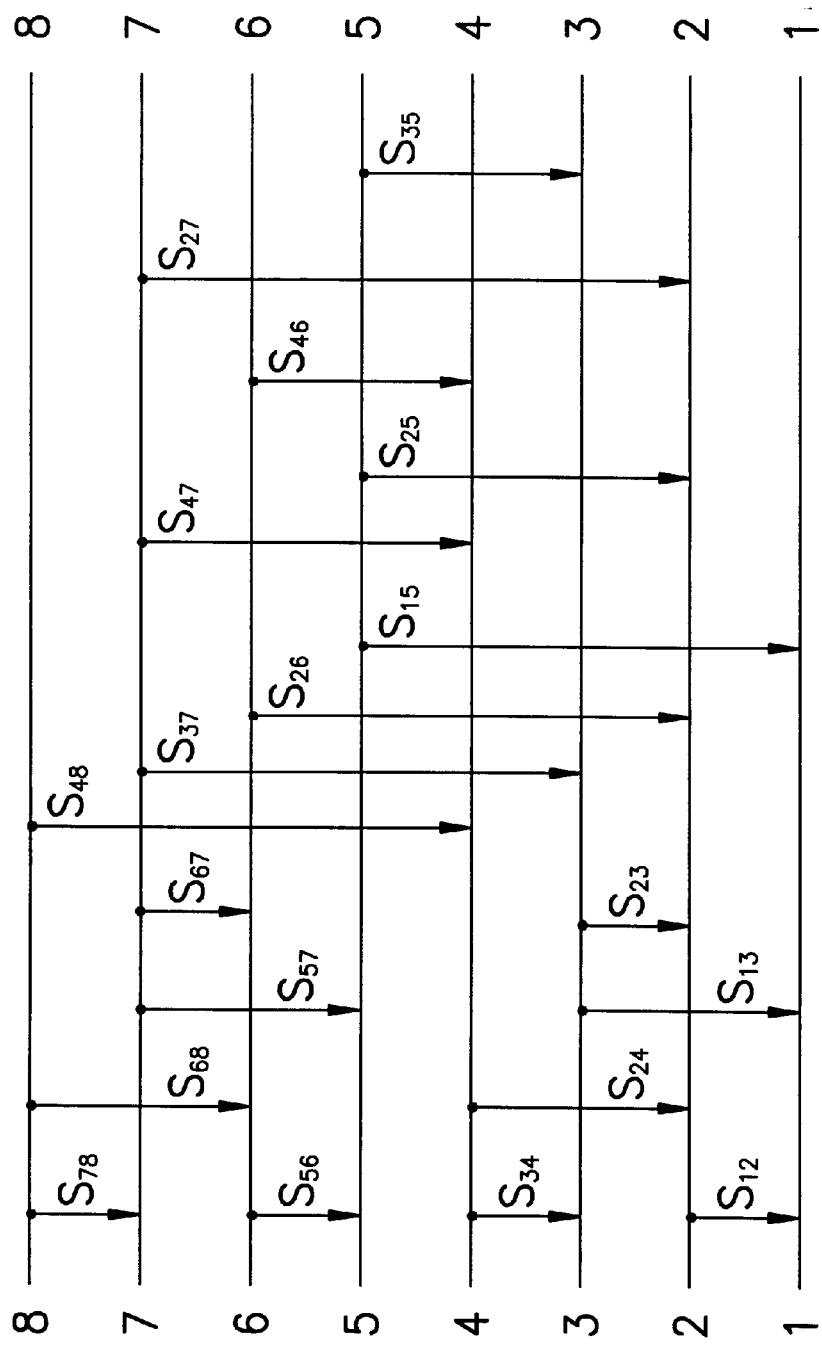
FIG. 5 is a diagram showing a relationship between the sorted cross-points according to the eight-level Batcher's odd-even merging network and the layout of mirrors inside the optical switch.
Figure 6:
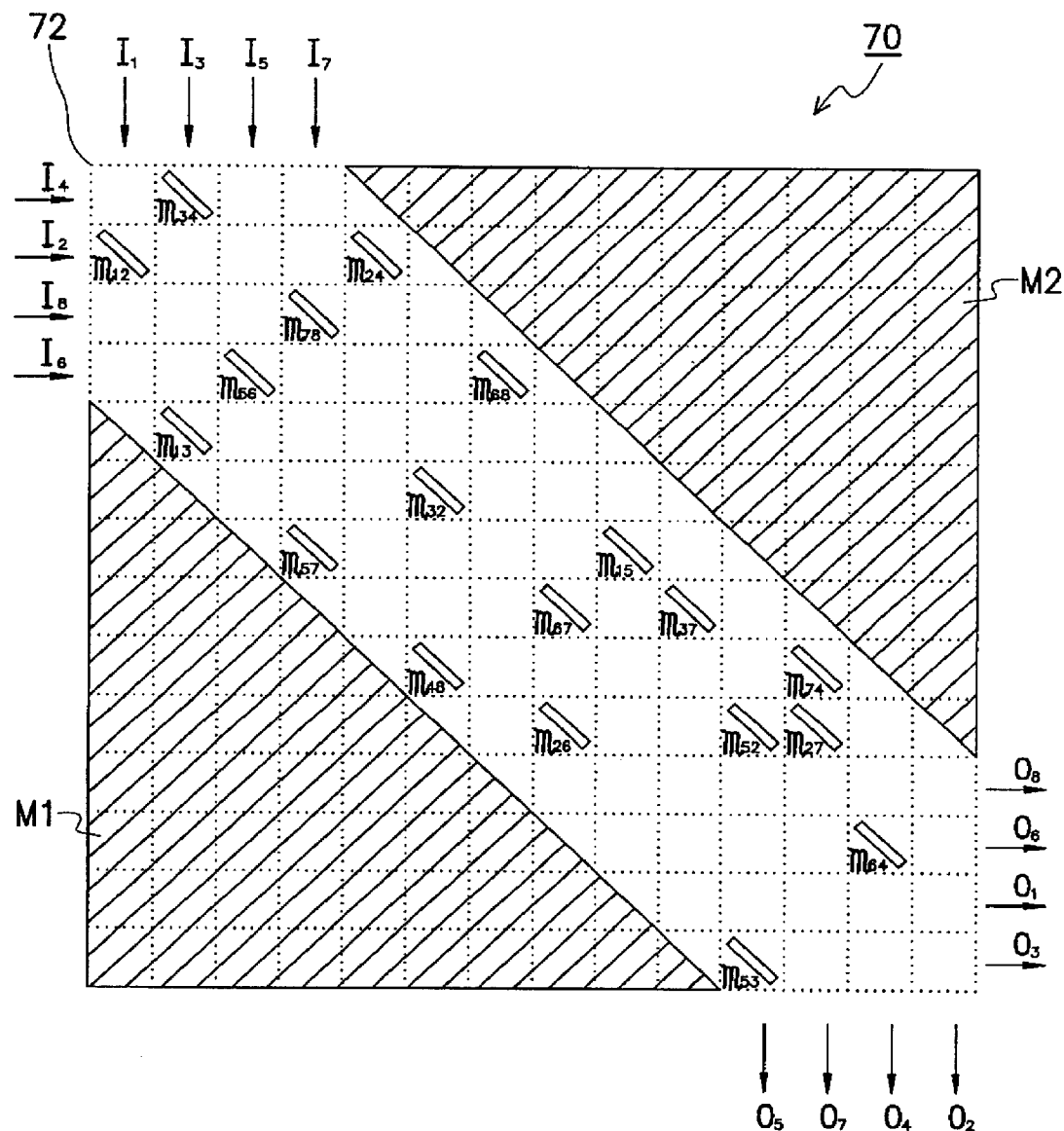
FIG. 6 is a schematic diagram of the layout of double-sided mirrors inside an 8-by-8 optical switch according to the ordering relationship shown in FIG. 5.

FIG. 6 is a schematic diagram of the layout of double-sided mirrors inside an 8-by-8 optical switch 70 according to the ordering relationship shown in FIG. 5. As shown in FIG. 6, the optical switch 70 has odd input terminals $I_1, I_3, I_5$ and $I_7$ and even input terminals $I_2, I_4, I_6$ and $I_8$ at the upper lefthand corner. The output terminals $O_1 \sim O_8$ are located at the lower righthand corner of the optical switch 70. There are two fixed single-sided reflecting mirrors M1 and M2 inside the multi-level optical switch 70. The reflecting surfaces of the first and the second single-sided reflecting mirrors M1 and M2 face each other and are parallel to each other. The area between the first and the second reflecting mirrors M1 and M2 form a double-sided reflecting mirror region 72. The input light beam paths are divided into an odd group that includes all the odd input terminals $I_1, I_3, I_5$ and $I_7$ and an even group that includes all the even input terminals $I_2, I_4, I_6$ and $I_8$. A network-switching algorithm such as the Batcher's odd-even merging network is used to compute a plurality of optical path cross-points for the odd input terminals $I_1, I_3, I_5$ and $I_7$ and even input terminals $I_2, I_4, I_6$ and $I_8$. These cross-points are shown in FIG. 5. For example, the presence of cross-point (7,8) indicates that a double-sided reflecting mirror $m_{78}$ should be mounted at the cross-point between optical path 7 and 8 inside the optical switch 70. For example, the four cross-points (1,2), (3,4), (5,6) and (7,8) in the first column of FIG. 5 correspond respectively to double-sided reflecting mirror $m_{12}$ (cross-point for optical paths 1 and 2), $m_{34}$ (cross-point for optical paths 3 and 4), $m_{56}$ (cross-point for optical paths 5 and 6) and $m_{78}$ (cross-point for optical paths 7 and 8).

Ultimately, all the double-sided reflecting mirrors inside the 8-by-8 optical switch can be positioned to form the structure shown in FIG. 6. For example, an optical path switching between optical paths 7 and 8 is conducted when mirror $m_{78}$ is raised. On the other hand, an optical path switching between optical paths 5 and 2 is conducted when mirror $m_{52}$ is raised.

Hence, the layout of double-sided reflecting mirrors in an optical switch of whatever level can be computed using the Batcher's odd-even merging network. Therefore, the method of this invention can be applied to the design of multi-level optical switches. In addition, because the smaller number of double-sided reflection mirrors is used, the size of the optical switch will be reduced.

Discussions between the conventional technique and the technique used in this invention with regard to mirror reduction and computational complexity are as followings.

The reduction in number of mirrors is explained with reference to Table 1. In Table 1, the first column lists the number of optical paths processed by the optical switch; the second column lists the number of reflecting mirrors required by a conventional one-to-one crossbar array type optical switch; the third column lists the number of double-sided reflecting mirrors found by above formula i.e., the theoretical minimum number of mirrors for achieving the optical switching; and the fourth column lists the number of double-sided reflecting mirrors obtained by the Batcher's odd-even merging network. The value inside the bracket is a reduction ratio in percentage with respect to the crossbar type optical switch. It is obvious from Table 1 that as the number of reflecting mirrors increases, optical switches of the present invention having multiple reflection mirrors employs relatively fewer mirrors compared to the crossbar type.

TABLE 1

| No. of optical paths processed by optical switch | No. of Mirrors inside cross bar type optical switch | Theoretical minimum No. of Mirrors for optical switching | No. of Mirrors inside optical switch using Batcher's merging network |
|---|---|---|---|
| 4 | 16 | 5(31%) | 5(31%) |
| 8 | 64 | 16(25%) | 19(30%) |
| 16 | 256 | 45(17%) | 63(25%) |
| 32 | 1024 | 118(18%) | 191(18%) |
| 64 | 4096 | 296(7%) | 543(13%) |

Next, the computational complexity of an optical switch increases as the number of double-sided reflecting mirrors used decreases. Hence, the controlling circuit for raising and lowering the reflecting mirrors will be more complicated. In other words, there is a trade-off between the complexity of the controlling circuit and the number of double-sided reflecting mirrors used. Usually, for an optical switch having a fixed number of sorting in the optimal condition, the steps required by a parallel processing network is inversely proportional to the square root of the area.

TABLE 2

| No. of optical paths in the optical switch | Total No. of logical computations in a crossbar type optical switch | Total No. of logical computations in optical switch designed according to Batcher's network | No. of parallel-processed steps in optical switch designed according to Batcher's network |
|---|---|---|---|
| 4 | 16 | 11(68%) | 3(0.75) |
| 8 | 64 | 49(77%) | 6(0.75) |
| 16 | 256 | 126(49%) | 10(0.63) |
| 32 | 1024 | 541(52%) | 16(0.50) |
| 64 | 4096 | 1536(38%) | 22(0.34) |

In an optical switch having a crossbar type array, all of the mirrors can be processed in parallel by comparing. That is, the controller of each reflecting mirror compares the desired destination with the actual destination of the optical path to determine whether the reflecting mirror should be raised or lowered. Since the number of simultaneously triggered logic computations and the number of reflecting mirrors are equal, only one parallel computation is needed (column 2 in Table 2).

For controlling a multiple grouping of mirrors, each step demands two operations, including comparing and storing into a register. The number of logical computations is three times the number of mirrors minus the number of optical paths. The results are shown in column 3 of Table 2. The percentage value in parentheses shows a reduction ratio of the number of logical computations relative to the total number of logical computations in a crossbar optical switch.

If there is no causality between the reflecting mirrors, these operations can be carried out simultaneously. The number of steps that can be processed simultaneously is shown in column 4 of Table 2. The value inside the parentheses is a value relative to the number of optical paths in the optical switch.

According to the considerations regarding mirror reduction and complexity of control, the following aspects of this invention may be noted:

The ratio of reflecting mirrors of the multi-mirror optical switch of this invention and the cross bar type optical switch decreases as the number of optical paths increases. As the number of reflecting mirrors decreases, the probability of mechanical failures and the number of production defects are greatly lowered. In addition, the probability of erroneous motion, the probability of failure and the power consumption of the entire optical switching system are likely to decrease.

The number of driving circuits for raising or lowering the reflecting mirrors is reduced as the number of reflecting mirrors is decreased. Moreover, the total number of logical computations also decrease. Hence, there is no complication of the control circuits.

Delay caused by parallel computations increases proportionally to the number of optical paths. However, as the operating speed of circuits continues to increase, circuit delay, compared to the response time for raising or lowering of the mirrors, will become negligible and hence acceptable. Furthermore, the increase in delay relative to the number of optical paths is slow.

In summary, this invention provides a multiple-mirror reflection optical switch having a mechanical switching design that differs from the conventional system. In this invention, computer algorithm and geometric optics are used for planning the configuration of the double-sided reflecting mirrors. In addition, micro-electrochemical systems are directly applied to this invention so that a small and compact optical switch having low power consumption is developed.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method of mirror layout inside a multi-level optical switch having a plurality of input terminals and a plurality of output terminals, comprising the steps of:

installing a first fixed single-sided reflecting mirror and a second fixed single-sided reflecting mirror such that reflecting surfaces of the first and the second fixed single-sided reflecting mirrors face each other and are parallel to each other, and such that a layout region for accommodating a plurality of double-sided reflecting mirrors is formed between the first and the second reflecting mirror;

dividing the input terminals into an odd group and an even group;

computing a plurality of optical path cross-points by feeding a plurality of input optical paths from the odd group and the even group using a network exchange algorithm; and installing the double-sided reflecting mirrors at the corresponding optical path cross-points in the layout region of the multi-level optical switch.

2. The method of claim 1, wherein the network exchange algorithm includes a Batcher's odd-even merging network algorithm.

3. The method of claim 1, wherein the number of input terminals is an integral power of 2.

4. The method of claim 1, wherein the multi-level optical switch has a rectangular matrix internal structure.

* * * * *